United States Patent
Honma et al.

(10) Patent No.: US 8,638,683 B2
(45) Date of Patent: Jan. 28, 2014

(54) FRAME SIGNAL GENERATING METHOD AND FRAME SIGNAL GENERATING DEVICE

(75) Inventors: Hiroyuki Honma, Kawasaki (JP); Mitsuru Tokane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 179 days.

(21) Appl. No.: 13/067,853

(22) Filed: Jun. 29, 2011

(65) Prior Publication Data
US 2012/0014270 A1   Jan. 19, 2012

(30) Foreign Application Priority Data
Jul. 16, 2010 (JP) .................. 2010-161250

(51) Int. Cl.
G01R 31/08 (2006.01)

(52) U.S. Cl.
USPC ........... 370/252; 370/228; 370/394; 370/389; 370/474; 370/541; 398/1; 398/2; 398/45; 398/49

(58) Field of Classification Search
USPC ......... 370/252, 228, 394, 230, 389, 397, 474, 370/535, 539, 541; 398/1, 2, 25, 45, 49
See application file for complete search history.

(56) References Cited

U.S. PATENT DOCUMENTS

| | | | |
|---|---|---|---|
| 7,664,139 B2 * | 2/2010 | Loprieno et al. ............. | 370/472 |
| 7,869,468 B1 * | 1/2011 | Giannakopoulos et al. .. | 370/535 |
| 2003/0123493 A1 * | 7/2003 | Takahashi ..................... | 370/539 |
| 2004/0062277 A1 * | 4/2004 | Flavin et al. .................. | 370/474 |
| 2004/0105456 A1 * | 6/2004 | Lanzone et al. .............. | 370/429 |
| 2007/0071443 A1 | 3/2007 | Fukumitsu et al. | |
| 2008/0219661 A1 * | 9/2008 | Lanzone et al. ............... | 398/45 |
| 2009/0175618 A1 * | 7/2009 | Yan ................................ | 398/25 |
| 2009/0317073 A1 * | 12/2009 | Hotchkiss et al. ............. | 398/1 |
| 2010/0054731 A1 * | 3/2010 | Oltman et al. .................. | 398/1 |
| 2010/0061725 A1 * | 3/2010 | Jiang ............................. | 398/45 |
| 2010/0098415 A1 * | 4/2010 | Jiang ............................. | 398/45 |
| 2010/0135658 A1 * | 6/2010 | Arao .............................. | 398/45 |
| 2010/0158518 A1 * | 6/2010 | Shin et al. ...................... | 398/45 |

(Continued)

FOREIGN PATENT DOCUMENTS

| | | |
|---|---|---|
| JP | 2007-096822 | 4/2007 |
| JP | 2008-113394 | 5/2008 |

OTHER PUBLICATIONS

Recommendation ITU-T G.709/Y.1331, "Interfaces for the Optical Transport Network", International Telecommunication Union, Dec. 2009.

*Primary Examiner* — Andrew Lai
*Assistant Examiner* — Andrew C Lee
(74) *Attorney, Agent, or Firm* — Staas & Halsey LLP

(57) ABSTRACT

A method for generating a frame signal includes monitoring a first frame signal and obtaining a first parameter based on the monitoring result; setting a second parameter based on the type of the first frame signal; when the first frame signal is being input, generating a second frame signal with a bit rate different from that of the first frame signal by determining data and stuff byte positions based on the first parameter and performing frame processing on data and stuff bytes corresponding to the first frame signal based on the determined data and stuff byte positions; and when the first frame signal is not being input, generating the second frame signal by determining the data and stuff byte positions based on the second parameter and performing the frame processing on data and stuff bytes corresponding to a maintenance signal based on the determined data and stuff byte positions.

13 Claims, 13 Drawing Sheets

(56) References Cited

U.S. PATENT DOCUMENTS

| | | | |
|---|---|---|---|
| 2010/0158519 A1* | 6/2010 | Dong et al. | 398/45 |
| 2010/0183301 A1* | 7/2010 | Shin et al. | 398/45 |
| 2011/0135305 A1* | 6/2011 | Barnard | 398/49 |
| 2011/0158658 A1* | 6/2011 | Myslinski et al. | 398/208 |
| 2011/0170859 A1* | 7/2011 | Conklin et al. | 398/25 |
| 2011/0170866 A1* | 7/2011 | Loprieno et al. | 398/45 |
| 2011/0262128 A1* | 10/2011 | Madrahalli et al. | 398/2 |
| 2011/0286742 A1* | 11/2011 | Nichols et al. | 398/43 |

* cited by examiner

FRAME SIGNAL GENERATING METHOD AND FRAME SIGNAL GENERATING DEVICE

CROSS-REFERENCE TO RELATED APPLICATION

This application is based upon and claims the benefit of priority of the prior Japanese Patent Application No. 2010-161250 filed on Jul. 16, 2010, the entire contents of which are incorporated herein by reference.

FIELD

The embodiments discussed herein are related to a frame signal generating method and a frame signal generating device.

BACKGROUND

The Optical Transport Network (OTN) is a standard framework for optical networks employing wavelength division multiplexing (WDM). The OTN makes it possible to accommodate different types of client signals and enables high-volume transmission. In an optical transmission system conforming to the OTN, client signals are contained or multiplexed in an optical transfer unit (OTU) frame of the OTN for transmission (see, for example, Japanese Laid-Open Patent Publication No. 2008-113394).

ITU-T G.709 defines the Asynchronous Mapping Procedure (AMP) that is a scheme to compensate for a difference between the bit rate of a frame signal and the bit rate of a signal to be contained in the frame signal. In the AMP, a signal (hereafter called a "constituent signal") to be contained in a frame signal is asynchronously mapped to the frame signal to compensate for the difference in the bit rates. ITU-T G.709 also defines the Generic Mapping Procedure (GMP) for mapping constituent signals having high and various bit rates. In the GMP, the number of data entities and the number of stuff bytes to be contained in an area of a frame are calculated based on the difference in the bit rates between the constituent signal and the frame signal, and the constituent signal is mapped to the frame signal to compensate for the difference in the bit rates.

SUMMARY

According to an aspect of the invention, there is provided a method for generating a frame signal performed by a network device. The method includes monitoring a first frame signal input to the network device and obtaining a first parameter based on the monitoring result; setting a second parameter based on the type of the first frame signal; when the first frame signal is being input to the network device, generating a second frame signal with a bit rate that is different from the bit rate of the first frame signal by determining data and stuff byte positions for frame processing based on the first parameter and by performing the frame processing on data and stuff bytes corresponding to the first frame signal based on the determined data and stuff byte positions; and when the first frame signal is not being input to the network device, generating the second frame signal by determining the data and stuff byte positions for the frame processing based on the second parameter and by performing the frame processing on data and stuff bytes corresponding to a maintenance signal based on the determined data and stuff byte positions.

The object and advantages of the invention will be realized and attained by means of the elements and combinations particularly pointed out in the claims.

It is to be understood that both the foregoing general description and the followed detailed description are exemplary and explanatory and are not restrictive of the invention as claimed.

DESCRIPTION OF EMBODIMENTS

Let us assume a device where a mapping procedure such as the AMP or the GMP is employed and a first frame signal with a first bit rate is placed in a second frame signal with a second bit rate that is different from the first bit rate. If input of the first frame signal is interrupted due to a communication error, the device needs to generate a maintenance signal in place of the first frame signal and place the maintenance signal in the second frame signal to output the maintenance signal.

The maintenance signal is normally generated by using an oscillator with a fixed frequency.

Therefore, to support various types of first frame signals (with various bit rates), the device needs to include multiple oscillators corresponding to the types of first frame signals. This in turn complicates the configuration of the device and increases the costs of the device.

An aspect of this disclosure makes it possible to generate a second frame signal for various types of first frame signals without complicating the configuration of a device and without increasing the costs of the device.

Preferred embodiments of the present invention will be described with reference to the accompanying drawings.

Figure 1:
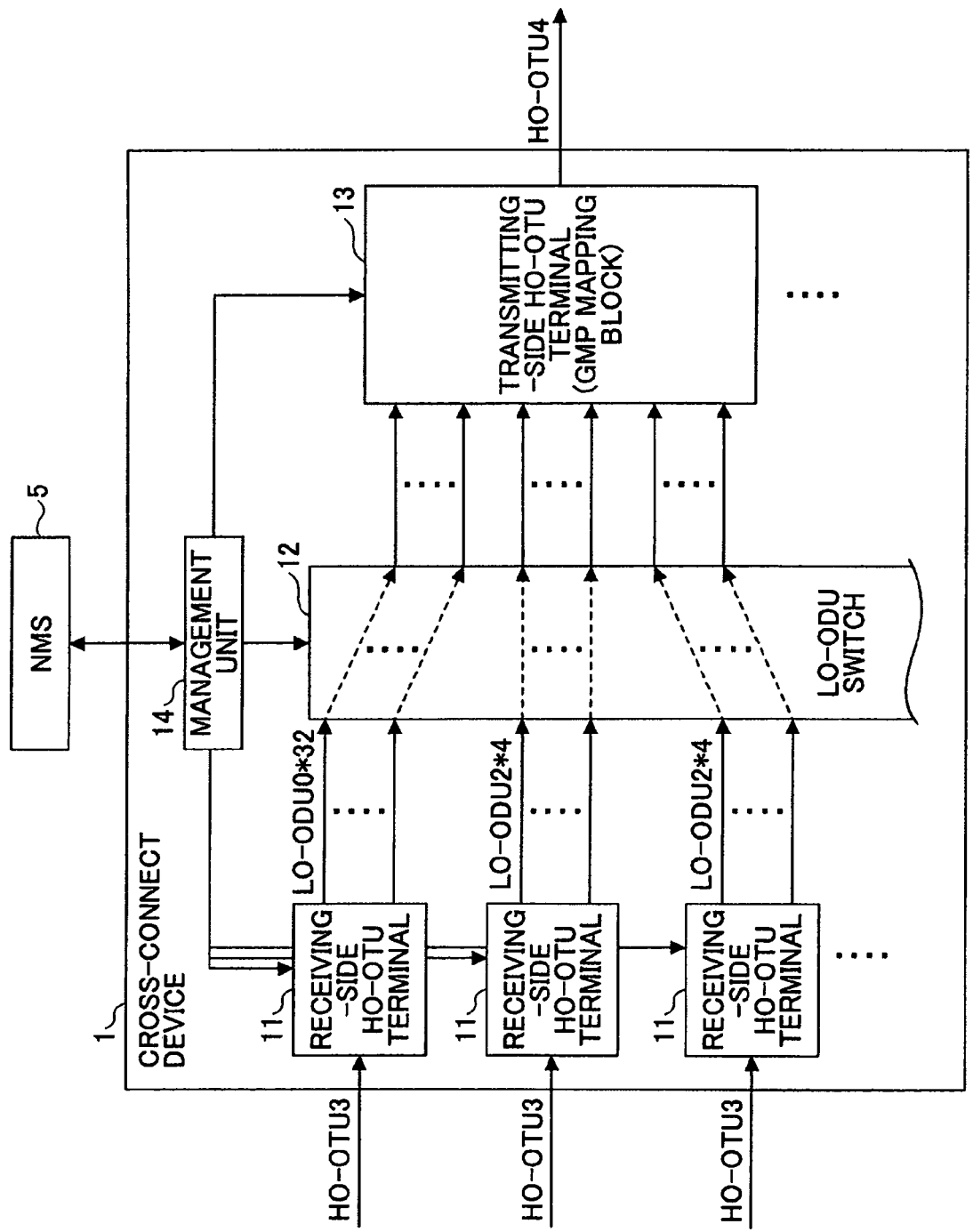
FIG. 1 is a block diagram illustrating a cross-connect device according to a first embodiment.

FIG. 1 is a block diagram illustrating a cross-connect device 1 according to a first embodiment.

The cross-connect device 1 converts HO-OTU3 signals (HO-OTU stands for higher order-optical channel transport unit) each containing LO-ODU0 signals (LO-ODU stands for lower order-optical channel data unit) or LO-ODU2 signals into at least one HO-OTU4 signal according to, for example, the GMP. As illustrated in FIG. 1, the cross-connect device 1 includes multiple receiving-side HO-OTU terminals 11, an LO-ODU switch 12, at least one transmitting-side HO-OTU terminal 13, and a management unit 14.

Each of the receiving-side HO-OTU terminals 11 receives an HO-OTU3 signal to be converted by the cross-connect device 1, converts the HO-OTU3 signal into an HO-ODU3 signal, and separates (or demultiplexes) and demaps the HO-ODU3 signal to output multiple LO-ODU0 signals or multiple LO-ODU2 signals.

In the example illustrated in FIG. 1, the receiving-side HO-OTU terminal 11 at the top position generates 32 LO-ODU0 signals from an HO-OTU3 signal, and each of the receiving-side HO-OTU terminals 11 at the second and third positions generates four LO-ODU2 signals from an HO-OTU3 signal.

The LO-ODU switch 12 receives the LO-ODU0 signals and the LO-ODU2 signals from the receiving-side HO-OTU terminals 11 and directs the signals to the corresponding transmitting-end HO-OTU terminal 13 (i.e., switches transmitting-end HO-OTU terminals 13). In the example of FIG. 1, 32 LO-ODU0 signals and 8 LO-ODU2 signals from three receiving-side HO-OTU terminals 11 are output to one transmitting-side HO-OTU terminal 13.

The transmitting-side HO-OTU terminal 13 maps the LO-ODU0 signals and the LO-ODU2 signals according to the GMP, combines the mapped signals to generate one HO-ODU4 signal, and converts the HO-ODU4 signal into an HO-OTU4 signal to be output. The transmitting-side HO-OTU terminal 13 has a function to generate a maintenance signal with a bit rate that is substantially the same as the bit rate of the HO-OTU3 signal and to place the maintenance signal in an HO-OTU4 frame when the input of the HO-OTU3 signal to the cross-connect device 1 is interrupted due to a communication error and at least one of the receiving-side HO-OTU terminals 11 becomes unable to receive the HO-OTU3 signal. The transmitting-side HO-OTU terminal 13 can generate the maintenance signal without using an oscillator having a corresponding frequency.

Figure 2:
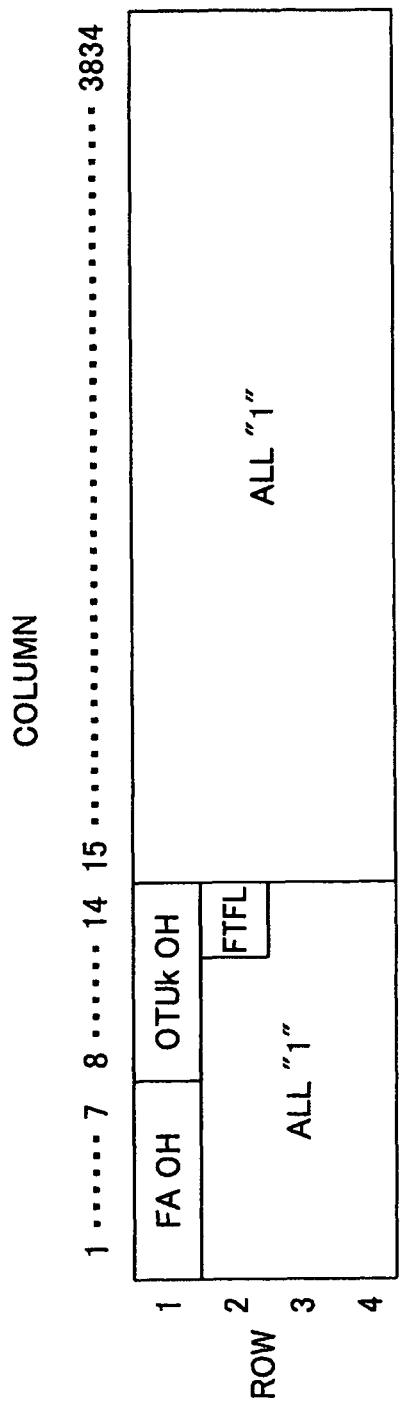
FIG. 2 is a drawing illustrating an exemplary structure of an AIS frame.

FIG. 2 illustrates a structure of an alarm indication signal (AIS) frame used as an example of the maintenance signal. The AIS frame includes an overhead area and a payload area. The overhead area includes fault type and fault location (FTFL) information in a predetermined position, and all bits of the payload area are set at "1".

The management unit 14 manages information used for signal processing by the receiving-side HO-OTU terminals 11, the LO-ODU switch 12, and the transmitting-side HO-OTU terminal 13. The management unit 14 determines the types of signals to be processed by the cross-connect device 1 and occurrences of communication errors based on information sent from a network management system (NMS) 5 for managing the entire optical network including the cross-connect device 1. For example, the management unit 14 manages a value Cm(t) used to generate the maintenance signal. The value Cm(t) is described later. In this embodiment, the management unit 14 functions as a parameter set circuit.

Figure 3:
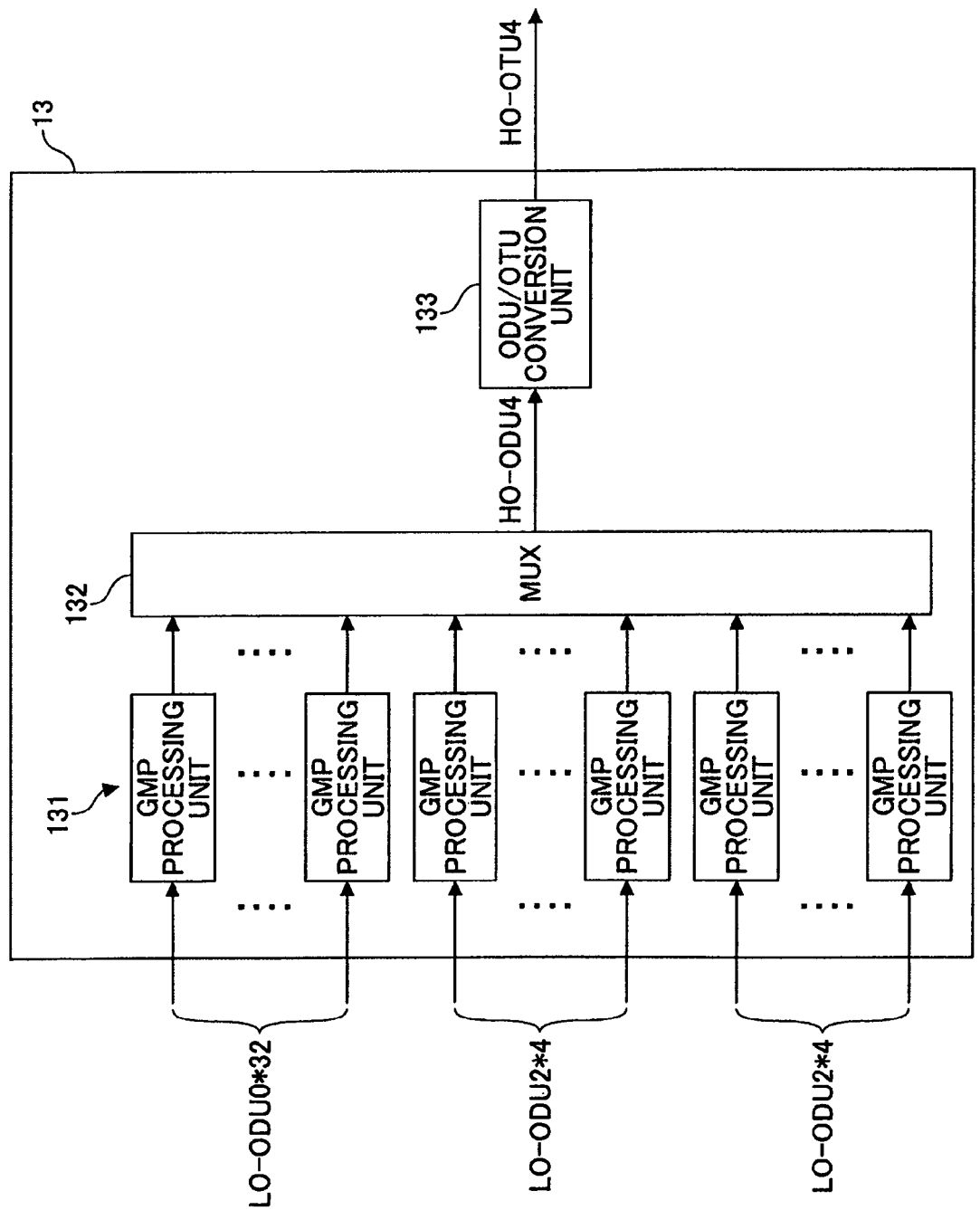
FIG. 3 is a block diagram illustrating an exemplary configuration of a transmitting-side HO-OTU terminal illustrated in FIG. 1.

FIG. 3 is a block diagram illustrating an exemplary configuration of the transmitting-side HO-OTU terminal 13.

As illustrated in FIG. 3, the transmitting-side HO-OTU terminal 13 includes GMP processing units 131 corresponding to the LO-ODU0 signals and the LO-ODU2 signals (hereafter called LO-ODUk signals) sent from the LO-ODU switch 12, a multiplexing unit (MUX) 132 that combines signals processed by the GMP processing units 131 to generate the HO-ODU4 signal, and an ODU/OTU conversion unit 133 that converts the HO-ODU4 signal into the HO-OTU4 signal.

Figure 4:
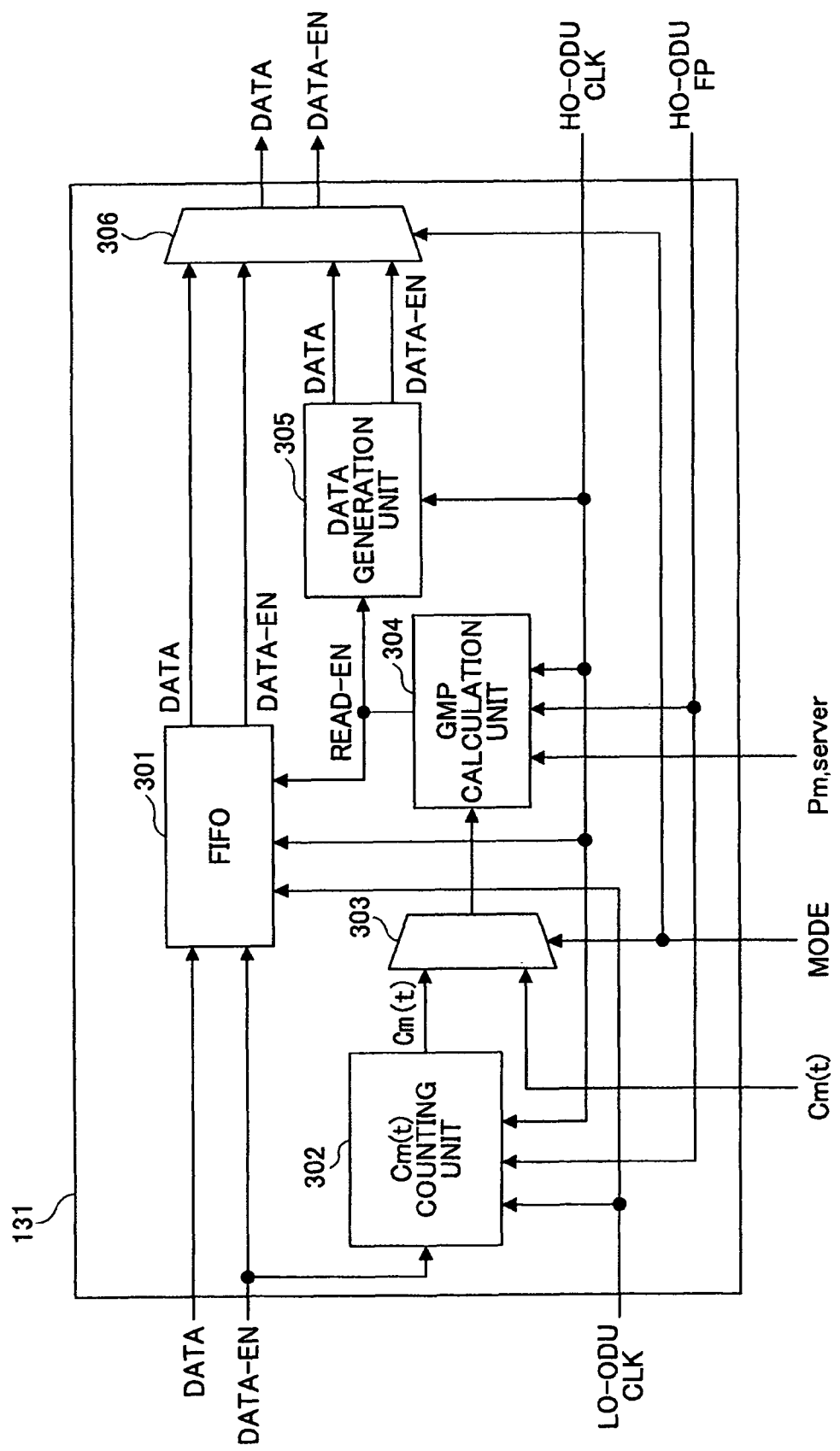
FIG. 4 is a block diagram illustrating an exemplary configuration of a GMP processing unit illustrated in FIG. 3.

FIG. 4 is a block diagram illustrating an exemplary configuration of the GMP processing unit 131.

As illustrated in FIG. 4, the GMP processing unit 131 includes a FIFO 301, a Cm(t) counting unit 302, a Cm(t) selection unit 303, a GMP calculation unit 304, a data generation unit 305, and a data selection unit 306. The Cm(t) counting unit 302 functions as a parameter obtain circuit. The FIFO 301, the Cm(t) selection unit 303, the GMP calculation unit 304, the data generation unit 305, and the data selection unit 306 function as a frame process circuit.

The FIFO 301 stores a data signal DATA that is input as the LO-ODUk signal to the GMP processing unit 131 according to the timing of a clock signal LO-ODU_CLK with a frequency corresponding to the bit rate of the LO-ODUk signal when a data enable signal DATA-EN is enabled (or is ON). The data enable signal DATA-EN is input to the GMP processing unit 131 together with the data signal DATA. Also, the FIFO 301 outputs the data signal DATA according to the timing of a clock signal HO-ODU_CLK with a frequency corresponding to the bit rate of an HO-ODUk signal when a read enable signal READ-EN output from the GMP calculation unit 304 is enabled (or is ON).

The Cm(t) counting unit 302 receives the data enable signal DATA-EN from a branch point of a signal path leading to the FIFO 301, counts the number of times the data enable signal DATA-EN is enabled (i.e., the number of data entities of the LO-ODUk signal) in one multiframe period of the HO-ODU4 signal, and outputs the count as a value Cm(t) to the Cm(t) selection unit 303. One multiframe period corresponds to the period of multiple frames (e.g., 80 HO-ODU4 frames) corresponding to the number of tributary slots in the HO-ODU4 signal.

The Cm(t) selection unit 303 determines operation modes based on operation mode information MODE from the management unit 14. When the operation mode is a normal mode where no communication error is detected, the Cm(t) selection unit 303 selects the value Cm(t) counted by the Cm(t) counting unit 302 and outputs the value Cm(t) to the GMP calculation unit 304. Meanwhile, when the operation mode is a maintenance mode where a communication error is detected, the Cm(t) selection unit 303 selects a value Cm(t) input from the management unit 14 and outputs the value Cm(t) to the GMP calculation unit 304. The management unit 14 sets the value Cm(t) to be input to the Cm(t) selection unit 303 according to the specifications of ITU-T G.709 based on the type of the LO-ODUk signal the input of which to the GMP processing unit 131 is interrupted due to a communication error.

For example, when the LO-ODU0 signal is interrupted, the value Cm(t) is calculated as described below. First, a value Cn corresponding to the LO-ODU0 frame is calculated based on the following formula:

$$Cn = f_{client} / f_{server} \times P_{m,server} / n$$
$$= 1.244160000 / 1.301709251 \times 121600 / 8$$
$$= 14528$$

In the above formula, $f_{client}$ indicates the bit rate [Gbps] of a first frame signal (in this example, the LO-ODU0 signal) to be generated and $f_{server}$ indicates the bit rate [Gbps] of one tributary slot group of a second frame signal (in this example, the HO-ODU4 signal) that is to contain the first frame signal. Also in the above formula, $P_{m,server}$ indicates the payload size [bits] per one tributary slot group of the second frame signal and "n" indicates the unit of mapping in bits.

Then, the value Cm(t) is calculated using the value Cn according to the following formula:

$$Cm(t) = int(Cn/M)$$
$$= int(Cn/1)$$
$$= 14528$$

In the above formula, M indicates the number of tributary slot groups that are necessary to contain the first frame signal and "int" is an operator for truncating the operand to obtain an integer.

After calculating the value Cm(t), 1 is added to the calculated value Cm(t) if a value ΣCnD defined in ITU-T G.709 is greater than M. In other words, the value Cm(t) indicates the number of bytes of a data signal to be contained in one tributary slot group of the HO-ODU4 signal when the input of the LO-ODU0 signal is interrupted. In the above example, the value Cm(t) is set at 14528 bytes when the value ΣCnD is lower than or equal to 1 or is set at 14529 bytes when the value ΣCnD is greater than 1.

Similarly, when the LO-ODU2 signal is interrupted, the value Cm(t) is calculated based on the following formulas:

$$Cn = f_{client}/f_{server} \times P_{m,server}/n$$
$$= 10.03727392/10.41367401 \times 972800/8$$
$$= 117205$$
$$Cm(t) = int(Cn/M)$$
$$= int(117205/8)$$
$$= 14650$$

The value Cm(t) indicates the number of bytes of a data signal to be contained in one tributary slot group of the HO-ODU4 signal when the input of the LO-ODU2 signal is interrupted. In this example, the value Cm(t) is set at 14650 bytes when the value ΣCnD is lower than or equal to 8 or is set at 14651 bytes when the value ΣCnD is greater than 8.

The GMP calculation unit 304 includes a circuit that counts a current position j based on a frame pulse signal HO-ODU_FP indicating the head (or the leading edge) of the HO-ODUk signal by using the clock signal HO-ODU_CLK that corresponds to the HO-ODUk signal as a trigger. The current position j indicates a position from the head of the HO-ODUk signal in bytes. The GMP calculation unit 304 controls the read enable signal READ-EN in synchronization with the counting of the circuit. When the current position j corresponds to the overhead of the HO-ODUk signal, the GMP calculation unit 304 disables the read enable signal READ-EN. Meanwhile, when the current position j corresponds to the payload of the HO-ODUk signal, the GMP calculation unit 304 controls the read enable signal READ-EN according to decision formulas used in the GMP. As an exception, when the current position j corresponds to one of columns 3801 through 3824 of the payload that correspond to stuff bytes in the HO-ODU4 frame, the GMP calculation unit 304 disables the read enable signal READ-EN.

The GMP calculation unit 304 determines the correspondence between the current position j and portions of the HO-ODUk signal based on formulas (1) through (3) below.

$$\text{Overhead: } j \bmod 3824 \leq 16 \tag{1}$$

$$\text{Payload: } j \bmod 3824 > 16 \tag{2}$$

$$\text{Stuff byte: } j \bmod 3824 > 3800 \tag{3}$$

In the above formulas, "mod" indicates an operator for obtaining a remainder.

When the current position j corresponds to the payload, the read enable signal READ-EN is controlled according to formulas (4) and (5) below based on the current position j, the value Cm(t) input from the Cm(t) selection unit 303, and the payload size $P_{m,server}$ input from the management unit 14.

$$\text{Enable: } j \times Cm(t) \bmod P_{m,server} < Cm(t) \tag{4}$$

$$\text{Disable: } j \times Cm(t) \bmod P_{m,server} \geq Cm(t) \tag{5}$$

In short, when the current position j satisfies formula (2) above (i.e., the current position j corresponds to the payload) and also satisfies formula (4), it is determined that the current position j corresponds to data in the mapping process according to the GMP and the read enable signal READ-EN is enabled. Meanwhile, when the current position j satisfies formula (2) and also satisfies formula (5), it is determined that the current position j corresponds to a stuff byte in the mapping process according to the GMP and the read enable signal READ-EN is disabled.

The GMP calculation unit 304 controls the read enable signal READ-EN based on formulas (1) through (5) above, and outputs the read enable signal READ-EN to the FIFO 301 when the operation mode information MODE indicates the normal mode or to the data generation unit 305 when the operation mode information MODE indicates the maintenance mode. In the normal mode, when the read enable signal READ-EN from the GMP calculation unit 304 is enabled, the FIFO 301 outputs the first one byte of stored data to the data selection unit 306 using the clock signal HO-ODUCLK that corresponds to the HO-ODUk signal as a trigger. Meanwhile, when the read enable signal READ-EN from the GMP calculation unit 304 is disabled, the FIFO 301 stops the output of data and instead, outputs stuff bytes (00h) generated by a stuff byte generating circuit (not shown) to the data selection unit 306. As a result, a data signal DATA where data and stuff bytes are mapped according to the GMP is sent to the data selection unit 306. Together with the data signal DATA, the FIFO 301 outputs the read enable signal READ-EN received from the GMP calculation unit 304 as a data enable signal DATA-EN to the data selection unit 306.

In the maintenance mode, according to the read enable signal READ-EN output from the GMP calculation unit 304, the data generation unit 305 generates a maintenance signal that is in synchronization with the clock signal HO-ODU_CLK corresponding to the HO-ODUk signal and outputs the maintenance signal to the data selection unit 306. Together with the maintenance signal, the data generation unit 305 outputs the read enable signal READ-EN received from the GMP calculation unit 304 as a data enable signal DATA-EN to the data selection unit 306.

Figure 5:
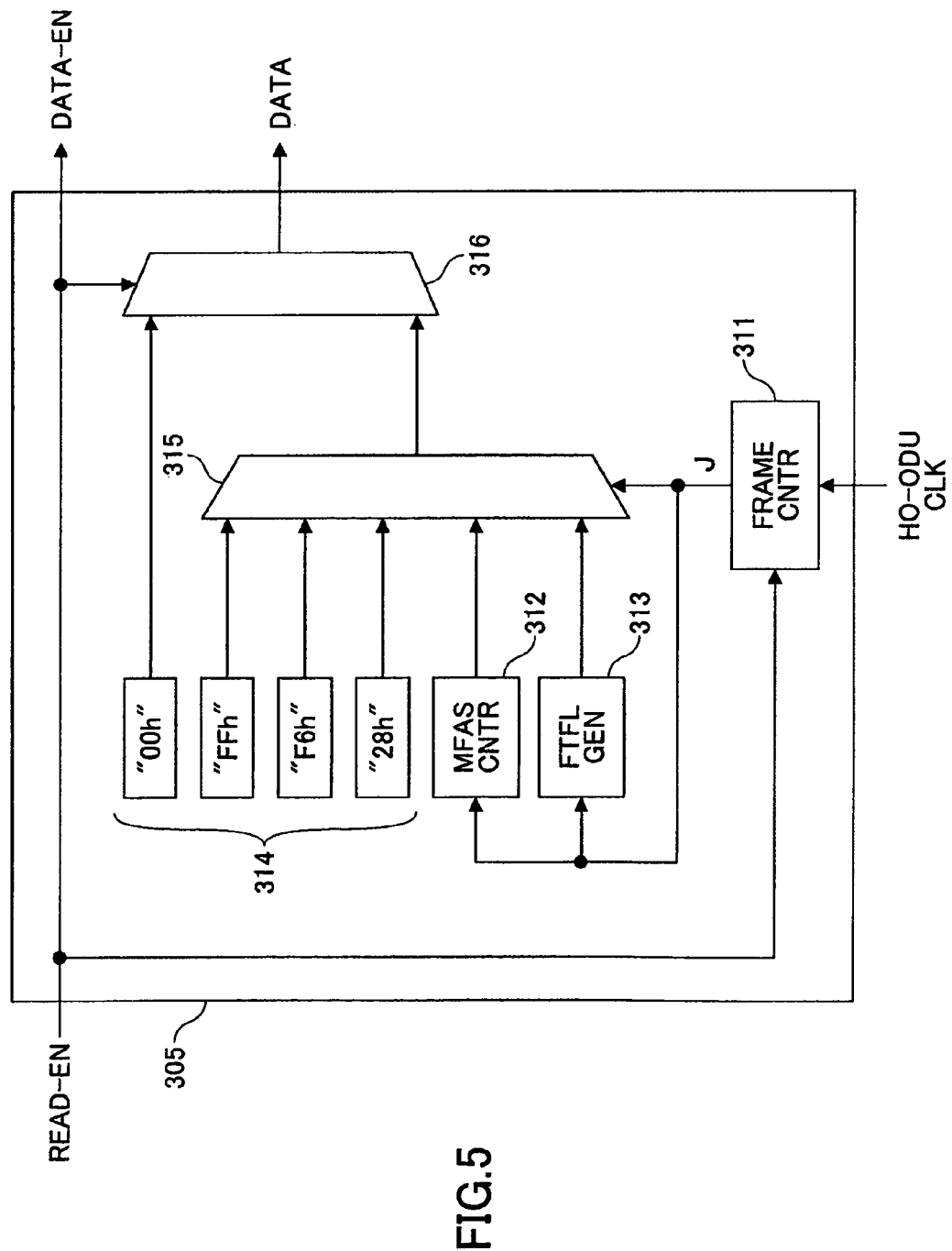
FIG. 5 is a block diagram illustrating an exemplary configuration of a data generation unit illustrated in FIG. 4.

FIG. 5 is a block diagram illustrating an exemplary configuration of the data generation unit 305.

As illustrated in FIG. 5, the data generation unit 305 includes a frame counter 311, a multiframe alignment signal (MFAS) counter 312, a fault type and fault location (FTFL) generation circuit 313, a data generation circuit 314, and first and second selectors 315 and 316.

The frame counter 311 counts a current position J from the head of the AIS frame signal illustrated in FIG. 2 according to the clock signal HO-ODU_CLK corresponding to the HO-ODUk signal only when the read enable signal READ-EN from the GMP calculation unit 304 is enabled. The current position J obtained by the frame counter 311 is output to the MFAS counter 312, the FTFL generation circuit 313, and the first selector 315.

The MFAS counter 312 starts counting an MFAS value each time when the count of the frame counter 311 goes through a cycle and the current position J returns to the head of the AIS frame signal. The FTFL generation circuit 313 generates FTFL information according to the count of the frame counter 311.

The first selector 315 selects one of data ("FFh", "F6h", and "28h") output from the data generation circuit 314, the MFAS value of the MFAS counter 312, and the FTFL information of the FTFL generation circuit 313 that corresponds to the current position J of the frame counter 311, and outputs the selected item to the second selector 316. When the read enable signal READ-EN is enabled, the second selector 316 selects data (the selected item) output from the first selector 315 and sends the data as the data signal DATA to the data selection unit 306. When the read enable signal READ-EN is disabled, the second selector 316 selects the stuff bytes (00h) output from the data generation circuit 314 and sends the stuff bytes as the data signal DATA to the data selection unit 306. Together with the data signal DATA, the data generation unit 305 outputs the read enable signal READ-EN received from the GMP calculation unit 304 as the data enable signal DATA-EN to the data selection unit 306. The data signal DATA and the data enable signal DATA-EN output from the data generation unit 305 to the data selection unit 306 are treated as an AIS frame signal (maintenance signal) used in the maintenance mode.

Referring back to FIG. 4, when the operation mode information MODE indicates the normal mode, the data selection unit 306 selects the data signal DATA and the data enable signal DATA-EN sent from the FIFO 301 and outputs the selected signals to the multiplexing unit 132 (see FIG. 3). Meanwhile, when the operation mode information MODE indicates the maintenance mode, the data selection unit 306 selects the AIS frame signal sent from the data generation unit 305 and outputs the AIS frame signal to the multiplexing unit 132.

Referring back to FIG. 3, the multiplexing unit 132 combines signals output from the GMP processing units 131 corresponding to the LO-ODU0 signals and the LO-ODU2 signals to generate the HO-ODU4 signal, and outputs the HO-ODU4 signal to the ODU/OTU conversion unit 133. The ODU/OTU conversion unit 133 generates the HO-OTU4 signal by adding overhead information corresponding to the HO-OTU4 frame, forward error correction (FEC) information, and so on to the HO-ODU4 signal from the multiplexing unit 132 and sends the HO-OTU4 signal to the outside of the cross-connect device 1.

When the input of an HO-OTU3 signal to the cross-connect device 1 is interrupted due to a communication error and the corresponding receiving-side HO-OTU terminal 11 becomes unable to receive the HO-OTU3 signal, the transmitting-side HO-OTU terminal 13 described above can automatically generate a maintenance signal (AIS frame signal) with substantially the same bit rate as that of the LO-ODUk signal according to the value Cm(t) input from the management unit 14 to the GMP processing unit 131 corresponding to the interrupted HO-OTU3 signal, and place the generated maintenance signal in the HO-OTU4 frame. Thus, this embodiment eliminates the need to use an oscillator with a fixed frequency to generate the maintenance signal and thereby makes it possible to generate the HO-OTU4 signal using a low-cost device with a simple configuration even when there are various types of HO-OTU3 signals and the LO-ODUk signals have various bit rates.

In the first embodiment, when a communication error occurs, the maintenance signal is generated during a mapping process performed according to the GMP by the transmitting-side HO-OTU terminal 13. Alternatively, the maintenance signal may be generated during a demapping process performed according to the GMP by the receiving-side HO-OTU terminal 11 to which the input of the HO-OTU3 signal is interrupted due to a communication error. In the present application, a mapping process and a demapping process may be called frame processing. An exemplary configuration of the receiving-side HO-OTU terminal 11 with a function to generate the maintenance signal is described below.

Figure 6:
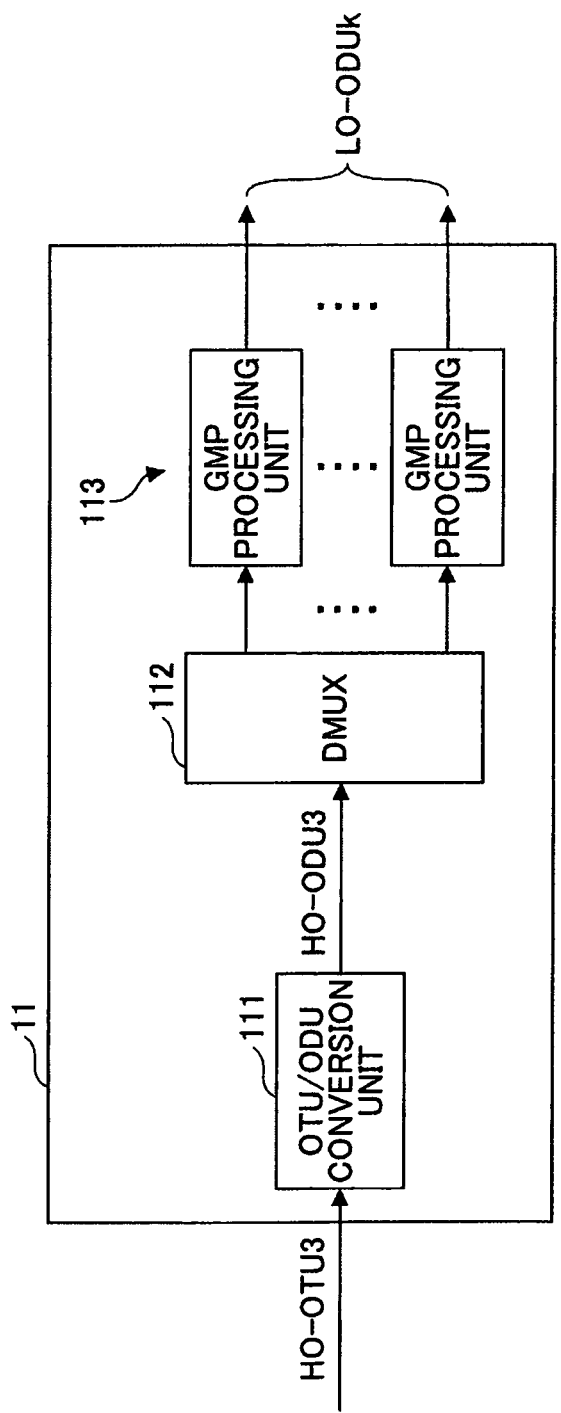
FIG. 6 is a block diagram illustrating an exemplary configuration of a receiving-side HO-OTU terminal illustrated in FIG. 1.

FIG. 6 is a block diagram illustrating an exemplary configuration of the receiving-side HO-OTU terminal 11.

In FIG. 6, the receiving-side HO-OTU terminal 11 includes an OTU/ODU conversion unit 111, a demultiplexing unit (DMUX) 112, and multiple GMP processing units 113. The OTU/ODU conversion unit 111 converts an HO-OTU3 signal input to the cross-connect device 1 into an HO-ODU3 signal and outputs the HO-ODU3 signal to the demultiplexing unit 112. The demultiplexing unit 112 separates or demultiplexes the HO-ODU3 signal from the OTU/ODU conversion unit 111 into multiple LO-ODU0 signals or LO-ODU2 signals (hereafter called LO-ODUk signals), and outputs the LO-ODUk signals to the corresponding GMP processing units 113. Each of the GMP processing units 113 demaps the LO-ODUk signal output from the demultiplexing unit 112 according to the GMP and outputs the demapped LO-ODUk signal to the LO-ODU switch 12 (see FIG. 1).

Figure 7:
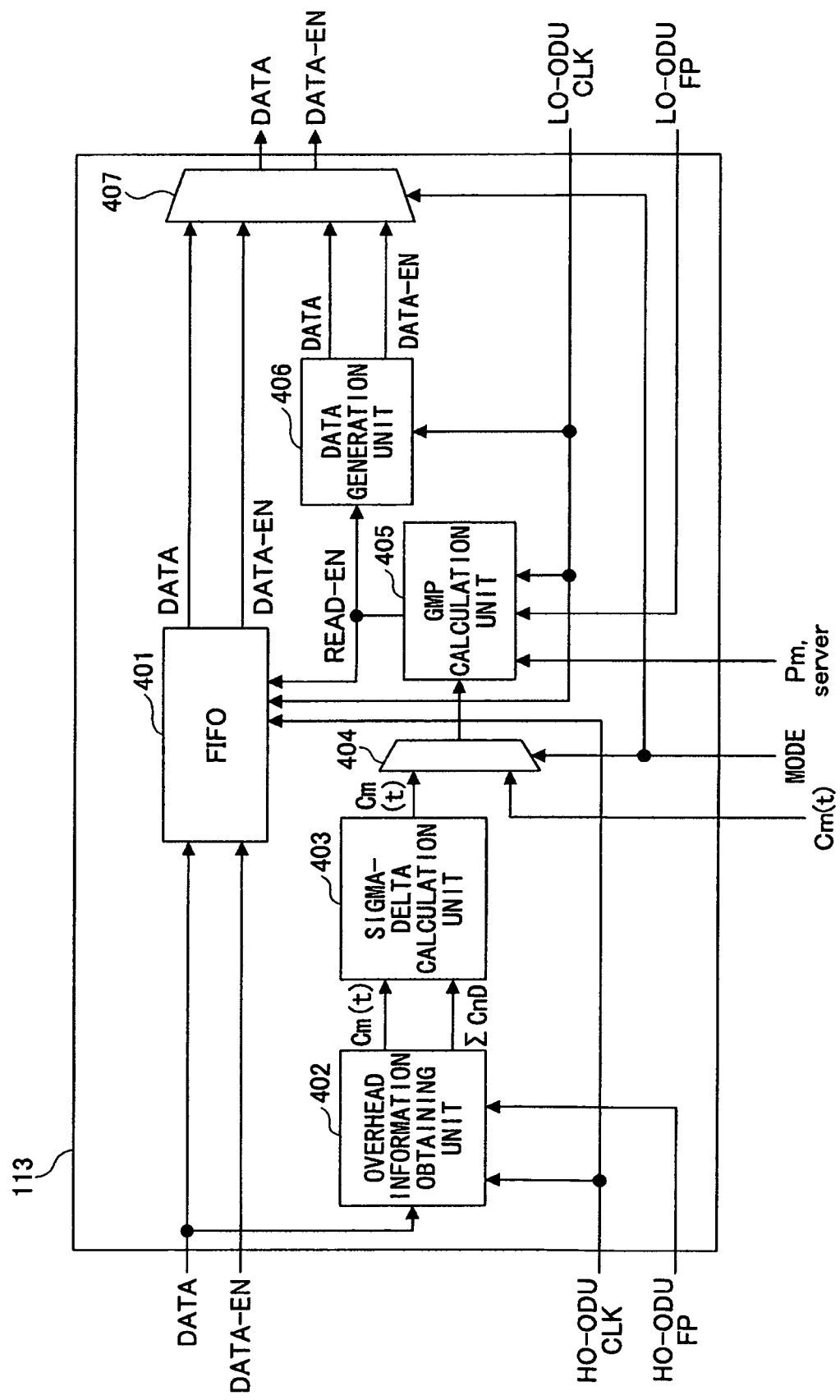
FIG. 7 is a block diagram illustrating an exemplary configuration of a GMP processing unit illustrated in FIG. 6.

FIG. 7 is a block diagram illustrating an exemplary configuration of the GMP processing unit 113 of the receiving-side HO-OTU terminal 11 of FIG. 6.

As illustrated in FIG. 7, the GMP processing unit 113 includes a FIFO 401, an overhead information obtaining unit 402, a sigma-delta calculation unit 403, a Cm(t) selection unit 404, a GMP calculation unit 405, a data generation unit 406, and a data selection unit 407. The overhead information obtaining unit 402 and the sigma-delta calculation unit 403 function as a parameter obtain circuit. The FIFO 401, the Cm(t) selection unit 404, the GMP calculation unit 405, the data generation unit 406, and the data selection unit 407 function as a frame process circuit.

The FIFO 401 stores a data signal DATA that is input as the HO-ODUk signal to the GMP processing unit 113 according to the timing of a clock signal HO-ODU_CLK with a frequency corresponding to the bit rate of the HO-ODUk signal when a data enable signal DATA-EN is enabled (or is ON). The data enable signal DATA-EN is input to the GMP processing unit 113 together with the data signal DATA. Also, the FIFO 401 outputs the data signal DATA according to the timing of a clock signal LO-ODUCLK with a frequency corresponding to the bit rate of the LO-ODUk signal when a read enable signal READ-EN output from the GMP calculation unit 405 is enabled (or is ON).

The overhead information obtaining unit 402 receives the data signal DATA from a branch point of a signal path leading to the FIFO 401. When triggered by the clock signal HO-ODU_CLK corresponding to the HO-ODUk signal, the overhead information obtaining unit 402 obtains a value Cm(t) and a value ΣCnD based on a frame pulse signal HO-ODU_FP indicating the head (or the leading edge) of the HO-ODUk signal and outputs the value Cm(t) and the value ΣCnD to the sigma-delta calculation unit 403. The value Cm(t) and the value E CnD are stored at predetermined positions in an optical channel payload unit (OPU) overhead of the data signal DATA (HO-ODUk frame).

The sigma-delta calculation unit 403 refers to the value Cm(t) and the value ΣCnD obtained by the overhead information obtaining unit 402 and determines whether to add 1 to the value Cm(t) based on the value ΣCnD according to the specifications of ITU-T G.709. Then, the sigma-delta calculation unit 403 outputs the resulting value Cm(t) to the Cm(t) selection unit 404.

The Cm(t) selection unit 404 determines operation modes based on operation mode information MODE from the management unit 14. When the operation mode is a normal mode where no communication error is detected, the Cm(t) selection unit 404 selects the value Cm(t) calculated by the sigma-delta calculation unit 403 and outputs the selected value Cm(t) to the GMP calculation unit 405. Meanwhile, when the operation mode is a maintenance mode where a communication error is detected, the Cm(t) selection unit 404 selects a value Cm(t) input from the management unit 14 and outputs the selected value Cm(t) to the GMP calculation unit 405. The value Cm(t) input from the management unit 14 to the Cm(t) selection unit 404 may be calculated in a manner similar to the value Cm(t) input from the management unit 14 to the Cm(t) selection unit 303 described above.

The GMP calculation unit 405 includes a circuit that counts a current position j based on a frame pulse signal LO-ODU_FP indicating the head of the LO-ODUk signal by using the clock signal LO-ODU_CLK that corresponds to the LO-ODUk signal as a trigger. The current position j indicates a position from the head of the LO-ODUk signal in bytes. The GMP calculation unit 405 controls the read enable signal READ-EN in synchronization with the counting of the circuit. The GMP calculation unit 405 controls the read enable signal READ-EN in a manner similar to that of the GMP calculation unit 304 of the GMP processing unit 131 of the transmitting-side HO-OTU terminal 13. The GMP calculation unit 405 outputs the read enable signal READ-EN to the FIFO 401 when the operation mode information MODE indicates the normal mode or to the data generation unit 406 when the operation mode information MODE indicates the maintenance mode.

In the normal mode, when the read enable signal READ-EN from the GMP calculation unit 405 is enabled, the FIFO 401 outputs the first one byte of stored data to the data selection unit 407 using the clock signal LO-ODU_CLK that corresponds to the LO-ODUk signal as a trigger. Meanwhile, when the read enable signal READ-EN from the GMP calculation unit 405 is disabled, the FIFO 401 stops the output of data. As a result, a data signal DATA where data and stuff bytes are demapped according to the GMP is sent to the data selection unit 407. Together with the data signal DATA, the FIFO 401 outputs the read enable signal READ-EN received from the GMP calculation unit 405 as a data enable signal DATA-EN to the data selection unit 407.

In the maintenance mode, according to the read enable signal READ-EN output from the GMP calculation unit 405, the data generation unit 406 generates a maintenance signal that is in synchronization with the clock signal LO-ODU_CLK corresponding to the LO-ODUk signal and outputs the maintenance signal to the data selection unit 407. Together with the maintenance signal, the data generation unit 406 outputs the read enable signal READ-EN received from the GMP calculation unit 405 as a data enable signal DATA-EN to the data selection unit 407. The configuration of the data generation unit 406 is substantially the same as that of the data generation unit 305 illustrated in FIG. 5.

When the operation mode information MODE indicates the normal mode, the data selection unit 407 selects the data signal DATA and the data enable signal DATA-EN sent from the FIFO 401 and outputs the selected signals to the LO-ODU switch 12 (see FIG. 1). Meanwhile, when the operation mode information MODE indicates the maintenance mode, the data selection unit 407 selects the AIS frame signal sent from the data generation unit 406 and outputs the AIS frame signal to the LO-ODU switch 12.

When the input of an HO-OTU3 signal to the cross-connect device 1 is interrupted due to a communication error, the receiving-side HO-OTU terminal 11 described above can automatically generate a maintenance signal (AIS frame signal) with substantially the same bit rate as that of the LO-ODUk signal according to the value Cm(t) input from the management unit 14 to the GMP processing unit 113, and place the generated maintenance signal in the LO-ODUk signal. Similarly to the case where the maintenance signal is generated by the transmitting-side HO-OTU terminal 13, the receiving-side HO-OTU terminal 11 as illustrated in FIG. 6 makes it possible to generate the HO-OTU4 signal with a low-cost device having a simple configuration. The GMP calculation units 304 and 405 and the data generation units 305 and 406 may be composed of a circuit, a Field-Programmable Gate Array (FPGA), or a processor.

Next, a second embodiment of the present invention is described.

Figure 8:
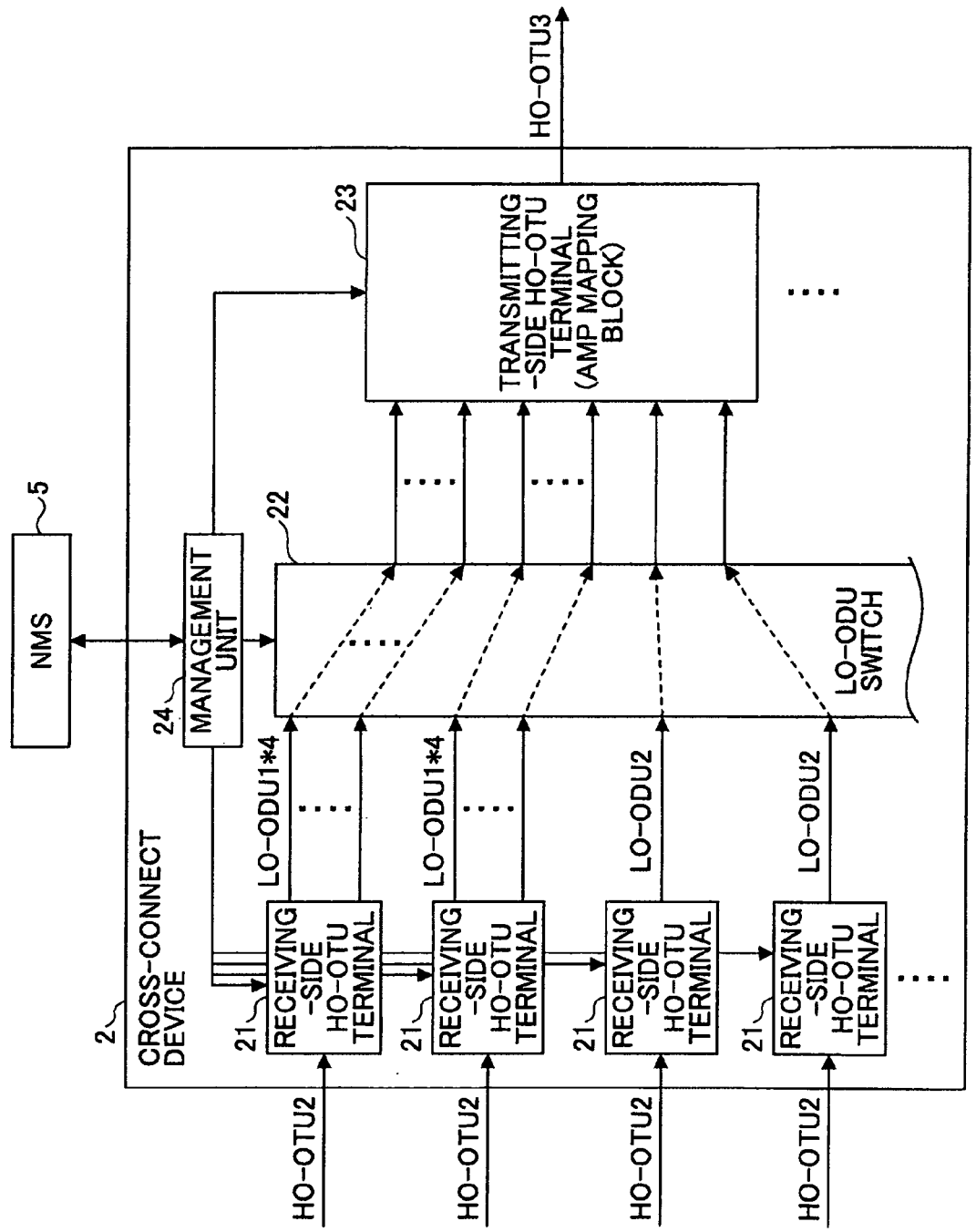
FIG. 8 is a block diagram illustrating a cross-connect device according to a second embodiment.

FIG. 8 is a block diagram illustrating a cross-connect device 2 according to the second embodiment.

The cross-connect device 2 converts HO-OTU2 signals each containing LO-ODU1 signals or a LO-ODU2 signal into at least one HO-OTU3 signal according to, for example, the AMP. As illustrated in FIG. 8, the cross-connect device 2 includes multiple receiving-side HO-OTU terminals 21, an LO-ODU switch 22, at least one transmitting-side HO-OTU terminal 23, and a management unit 24.

Each of the receiving-side HO-OTU terminals 21 receives an HO-OTU2 signal to be converted by the cross-connect device 2, converts the HO-OTU2 signal into an HO-ODU2 signal, separates (or demultiplexes) and demaps the HO-ODU2 signal to output multiple LO-ODU1 signals or one LO-ODU2 signal. In the example illustrated in FIG. 8, each of the receiving-side HO-OTU terminals 21 at the top and second positions generates four LO-ODU1 signals from an HO-OTU2 signal, and each of the receiving-side HO-OTU terminals 21 at the third and fourth positions generates one LO-ODU2 signal from an HO-OTU2 signal.

The LO-ODU switch 22 receives the LO-ODU1 signals and the LO-ODU2 signals from the receiving-side HO-OTU terminals 21 and directs the signals to the corresponding transmitting-end HO-OTU terminal 23 (i.e., switches transmitting-end HO-OTU terminals 23). In the example of FIG. 8, eight LO-ODU1 signals and two LO-ODU2 signals from four receiving-side HO-OTU terminals 21 are output to one transmitting-side HO-OTU terminal 23.

The transmitting-side HO-OTU terminal 23 maps the LO-ODU1 signals and the LO-ODU2 signals according to the AMP, combines the mapped signals to generate one HO-ODU3 signal, and converts the HO-ODU3 signal into an HO-OTU3 signal to be output. Similarly to the first embodiment, the transmitting-side HO-OTU terminal 23 of the second embodiment has a function to generate a maintenance signal with a bit rate that is substantially the same as the bit rate of the HO-OTU2 signal and to place the maintenance signal in an HO-OTU3 frame when the input of the HO- OTU2 signal to the cross-connect device 2 is interrupted due to a communication error and at least one of the receiving-side HO-OTU terminals 21 becomes unable to receive the HO-OTU2 signal. The transmitting-side HO-OTU terminal 23 can generate the maintenance signal without using an oscillator having a corresponding frequency.

The management unit 24 manages information used for signal processing by the receiving-side HO-OTU terminals 21, the LO-ODU switch 22, and the transmitting-side HO-OTU terminal 23. The management unit 24 determines the types of signals to be processed by the cross-connect device 2 and occurrences of communication errors based on information sent from a network management system (NMS) 5 for managing the entire optical network including the cross-connect device 2. For example, the management unit 24 manages a value JC used to generate the maintenance signal. The value JC is described later. In this embodiment, the management unit 24 functions as a parameter set circuit.

Figure 9:
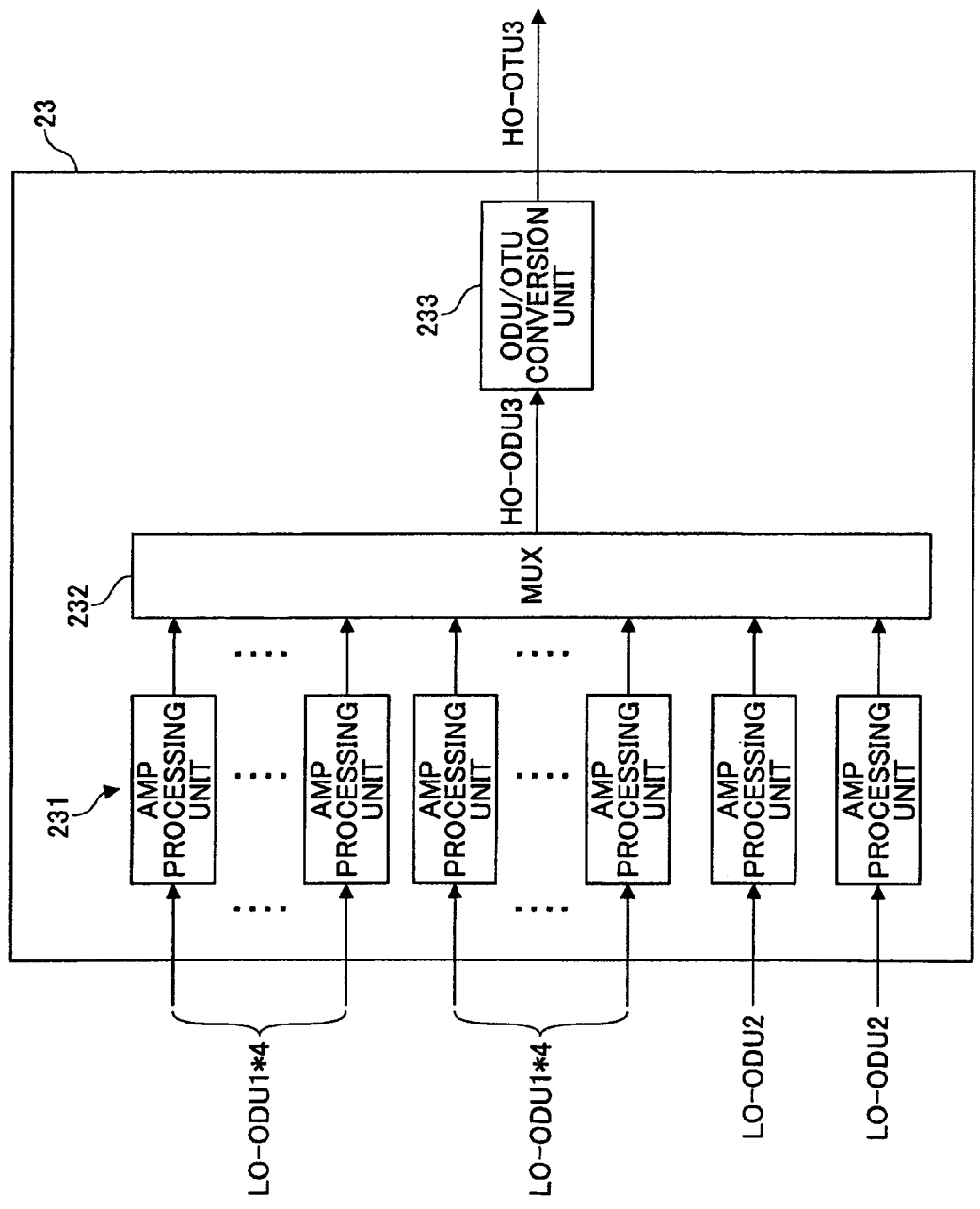
FIG. 9 is a block diagram illustrating an exemplary configuration of a transmitting-side HO-OTU terminal illustrated in FIG. 8.

FIG. 9 is a block diagram illustrating an exemplary configuration of the transmitting-side HO-OTU terminal 23.

As illustrated in FIG. 9, the transmitting-side HO-OTU terminal 23 includes AMP processing units 231 corresponding to the LO-ODU1 signals and the LO-ODU2 signals (hereafter called LO-ODUk signals) sent from the LO-ODU switch 22, a multiplexing unit (MUX) 232 that combines signals processed by the AMP processing units 231 to generate the HO-ODU3 signal, and an ODU/OTU conversion unit 233 that converts the HO-ODU3 signal into the HO-OTU3 signal.

Figure 10:
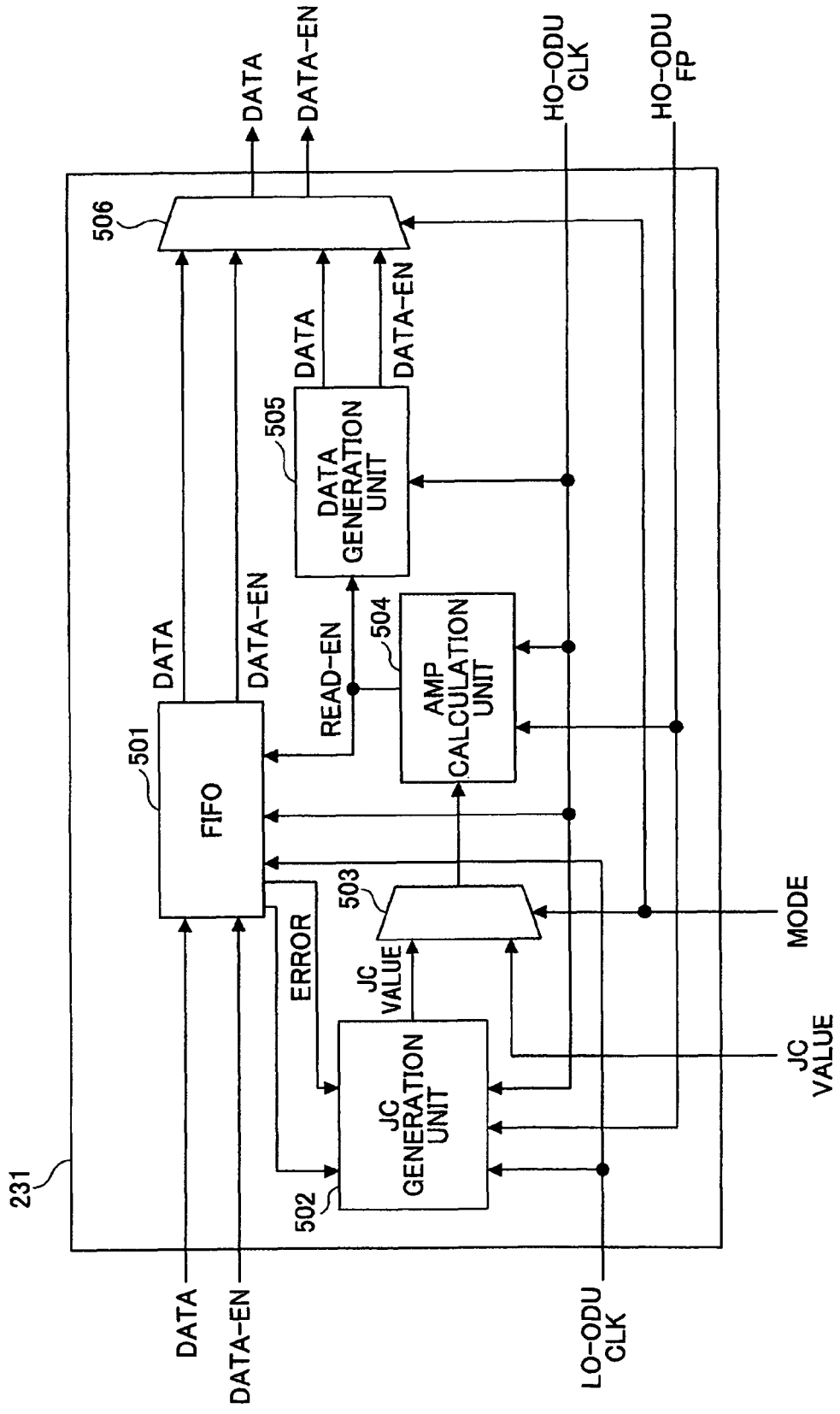
FIG. 10 is a block diagram illustrating an exemplary configuration of an AMP processing unit illustrated in FIG. 9.

FIG. 10 is a block diagram illustrating an exemplary configuration of the AMP processing unit 231.

As illustrated in FIG. 10, the AMP processing unit 231 includes a FIFO 501, a JC generation unit 502, a JC selection unit 503, an AMP calculation unit 504, a data generation unit 505, and a data selection unit 506. The JC generation unit 502 functions as a parameter obtain circuit. The FIFO 501, the JC selection unit 503, the AMP calculation unit 504, the data generation unit 505, and the data selection unit 506 function as a frame process circuit.

The FIFO 501 stores a data signal DATA that is input as the LO-ODUk signal to the AMP processing unit 231 according to the timing of a clock signal LO-ODU CLK with a frequency corresponding to the bit rate of the LO-ODUk signal when a data enable signal DATA-EN is enabled (or is ON). The data enable signal DATA-EN is input to the AMP processing unit 231 together with the data signal DATA. If an underflow error or an overflow error occurs when storing the data signal DATA, the FIFO 501 outputs a signal ERROR indicating the occurrence of the error to the JC generation unit 502. Also, the FIFO 501 outputs the data signal DATA according to the timing of a clock signal HO-ODU_CLK with a frequency corresponding to the bit rate of an HO-ODUk signal when a read enable signal READ-EN output from the AMP calculation unit 504 is enabled (or is ON).

The JC generation unit 502 monitors the signal ERROR indicating the occurrence of an underflow error or an overflow error that is output from the FIFO 501 at a cycle of one multiframe period of the HO-ODU3 signal and thereby determines a value JC indicating the seventh and eighth bits of a justification control (JC) byte of the data signal DATA input to the FIFO 501. Then, the JC generation unit 502 outputs the value JC to the JC selection unit 503. One multiframe period corresponds to the period of multiple frames (e.g., 80 HO-ODU3 frames) corresponding to the number of tributary slots in the HO-ODU3 signal.

In this embodiment, the JC generation unit 502 determines the value JC based on the occurrence of an underflow error or an overflow error at the FIFO 501. Alternatively, the value JC may be determined based on a count of the number of times the data enable signal DATA-EN input to the FIFO 501 is enabled (i.e., the number of data entities of the LO-ODUk signal) in one multiframe period of the HO-ODU3 signal.

A method of calculating the value JC (a value indicating the seventh and eighth bits of the JC byte) is described below.

In the descriptions below, $f_{fclient}$ indicates the bit rate of a frame signal (here, the LO-ODUk signal) to be mapped according to the AMP; $f_{ODTUjk}$ indicates the bit rate of an ODTUjk signal (ODTU stands for optical channel data tributary unit) that is defined in ITU-T G.709 and obtained by removing stuff bytes from the LO-ODUk signal; $P_{ODTUjk}$ indicates the number of bytes of the payload of the ODTUjk signal; and JCnumber indicates the number of times a negative justification opportunity (NJO) byte and a positive justification opportunity (PJO) byte of the ODTUjk signal are adjusted by the JC byte.

The value JC takes one of four values "00", "01", "10", and "11". In determining the value JC, a criterion C is obtained based on formula (6) below, and one of formulas (7) through (10) below that is satisfied by the criterion C is determined.

$$\text{Criterion } C = [P_{ODTUjk} - (f_{fclient}/f_{ODTUjk} \times P_{ODTUjk})] / JCnumber \quad (6)$$

$$\text{Value } JC = \text{"00"}: \text{criterion } C = 0 \quad (7)$$

$$\text{value } JC = \text{"01"}: 0 < criterion\ C \leq 1 \quad (8)$$

$$\text{value } JC = \text{"10"}: 1 < criterion\ C \leq 2 \quad (9)$$

$$\text{value } JC = \text{"11"}: -1 < criterion\ C \leq 0 \quad (10)$$

When the calculated criterion C is not an integer, the value JC="00" or "01" is used for adjustment according to the proportion of the fractional part of the criterion C. The value JC="01" is used for the adjustment only when 1<criterion C<2. In other cases, the value JC="00" is used for the adjustment. For example, when the calculated criterion C is 1.33, the value JC="10" is used for 33 frames in 100 frames and the value JC="01" is used for 67 frames.

The JC selection unit 503 determines operation modes based on operation mode information MODE input from the management unit 24. When the operation mode is a normal mode where no communication error is detected, the JC selection unit 503 selects the value JC input from the JC generation unit 502 and outputs the selected value JC to the AMP calculation unit 504. Meanwhile, when the operation mode is a maintenance mode where a communication error is detected, the JC selection unit 503 selects a value JC input from the management unit 24 and outputs the selected value JC to the AMP calculation unit 504. The value JC input from the management unit 24 to the JC selection unit 503 is set by the management unit 24 based on formulas (6) through (10) described above.

For example, when the LO-ODU1 signal is interrupted, the criterion C is calculated according to formula (6) as follows:

$$[30336 - (2.498775126/2.499082475 \times 30336)] / 2 = 1.8654$$

In this case, the criterion C satisfies formula (9) and the value JC is set at "10". Since the criterion C has a fractional part, the value JC="10" is used for 86 frames in 100 frames and the value JC="01" is used for 14 frames.

As another example, when the LO-ODU2 signal is interrupted, the criterion C is calculated according to formula (6) as follows:

[121856−(10.037273924/10.038288814×121856)]/8=1.5399

In this case, the criterion C satisfies formula (9) and the value JC is set at "10". Since the criterion C has a fractional part, the value JC="10" is used for 53 frames in 100 frames and the value JC="01" is used for 47 frames.

The AMP calculation unit 504 includes a circuit that counts a current position j based on a frame pulse signal HO-ODU_FP indicating the head (or the leading edge) of the HO-ODUk signal by using the clock signal HO-ODU_CLK that corresponds to the HO-ODUk signal as a trigger. The current position j indicates a position from the head of the HO-ODUk signal in bytes. The AMP calculation unit 504 controls the read enable signal READ-EN in synchronization with the counting of the circuit. When the current position j corresponds to the overhead of the HO-ODUk signal, the AMP calculation unit 504 disables the read enable signal READ-EN. When the current position j corresponds to the PJO byte or the NJO byte, the AMP calculation unit 504 determines whether to enable or disable the read enable signal READ-EN based on the value JC according to the AMP. When the current position j corresponds to other portions of the payload of the HO-ODUk signal, the AMP calculation unit 504 enables the read enable signal READ-EN. The AMP calculation unit 504 determines whether the current position j corresponds to the overhead or the payload of the HO-ODUk signal based on formulas (1) and (2) described above.

The AMP calculation unit 504 outputs the read enable signal READ-EN controlled as described above to the FIFO 501 when the operation mode information MODE indicates the normal mode or to the data generation unit 505 when the operation mode information MODE indicates the maintenance mode. In the normal mode, when the read enable signal READ-EN from the AMP calculation unit 504 is enabled, the FIFO 501 outputs the first one byte of stored data to the data selection unit 506 using the clock signal HO-ODU_CLK that corresponds to the HO-ODUk signal as a trigger. Meanwhile, when the read enable signal READ-EN from the AMP calculation unit 504 is disabled, the FIFO 501 stops the output of data and instead, outputs stuff bytes (00h) generated by a stuff byte generating circuit (not shown) to the data selection unit 506. As a result, a data signal DATA where data and stuff bytes are mapped according to the AMP is sent to the data selection unit 506. Together with the data signal DATA, the FIFO 501 outputs the read enable signal READ-EN received from the AMP calculation unit 504 as a data enable signal DATA-EN to the data selection unit 506.

In the maintenance mode, according to the read enable signal READ-EN output from the AMP calculation unit 504, the data generation unit 505 generates a maintenance signal that is in synchronization with the clock signal HO-ODU_CLK corresponding to the HO-ODUk signal and outputs the maintenance signal to the data selection unit 506. Together with the maintenance signal, the data generation unit 505 outputs the read enable signal READ-EN received from the AMP calculation unit 504 as a data enable signal DATA-EN to the data selection unit 506. The configuration of the data generation unit 505 is substantially the same as that of the data generation unit 305 illustrated in FIG. 5.

When the operation mode information MODE indicates the normal mode, the data selection unit 506 selects the data signal DATA and the data enable signal DATA-EN sent from the FIFO 501 and outputs the selected signals to the multiplexing unit 232 (see FIG. 9). Meanwhile, when the operation mode information MODE indicates the maintenance mode, the data selection unit 506 selects the AIS frame signal sent from the data generation unit 505 and outputs the AIS frame signal to the multiplexing unit 232.

Referring back to FIG. 9, the multiplexing unit 232 combines signals output from the AMP processing units 231 corresponding to the LO-ODU1 signals and the LO-ODU2 signals to generate the HO-ODU3 signal, and outputs the HO-ODU3 signal to the ODU/OTU conversion unit 233. The ODU/OTU conversion unit 233 generates the HO-OTU3 signal by adding overhead information corresponding to the HO-OTU3 frame, FEC information, and so on to the HO-ODU3 signal from the multiplexing unit 232, and sends the HO-OTU3 signal to the outside of the cross-connect device 2.

When the input of an HO-OTU2 signal to the cross-connect device 2 is interrupted due to a communication error and the corresponding receiving-side HO-OTU terminal 21 becomes unable to receive the HO-OTU2 signal, the transmitting-side HO-OTU terminal 23 described above can automatically generate a maintenance signal (AIS frame signal) with substantially the same bit rate as that of the HO-OTU2 signal according to the value JC input from the management unit 24 to the AMP processing unit 231 corresponding to the interrupted HO-OTU2 signal, and place the generated maintenance signal in the HO-OTU3 frame. Thus, this embodiment eliminates the need to use an oscillator with a fixed frequency to generate the maintenance signal and thereby makes it possible to generate the HO-OTU3 signal using a low-cost device with a simple configuration even when there are various types of HO-OTU2 signals and the LO-ODUk signals have various bit rates.

In the second embodiment, when a communication error occurs, the maintenance signal is generated during a mapping process performed according to the AMP by the transmitting-side HO-OTU terminal 23. Alternatively, the maintenance signal may be generated during a demapping process performed according to the AMP by the receiving-side HO-OTU terminal 21 to which input of the HO-OTU2 signal is interrupted due to a communication error. In the present application, a mapping process and a demapping process may be called frame processing. An exemplary configuration of the receiving-side HO-OTU terminal 21 with a function to generate the maintenance signal is described below.

Figure 11:
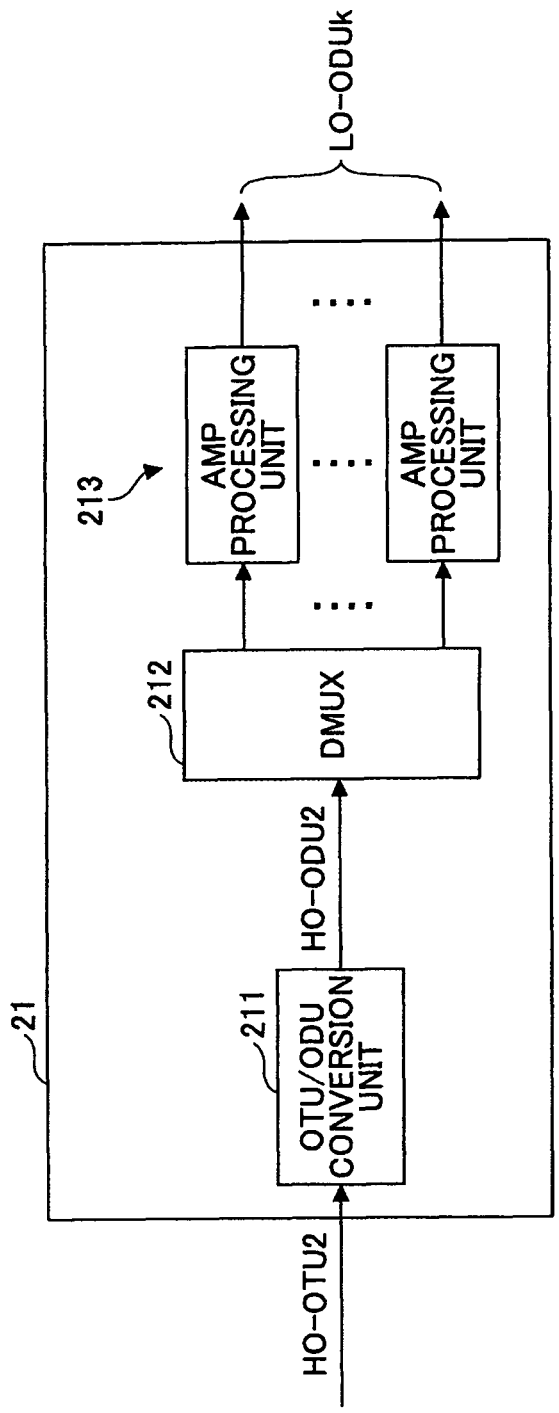
FIG. 11 is a block diagram illustrating an exemplary configuration of a receiving-side HO-OTU terminal illustrated in FIG. 8.

FIG. 11 is a block diagram illustrating an exemplary configuration of the receiving-side HO-OTU terminal 21.

In FIG. 11, the receiving-side HO-OTU terminal 21 includes an OTU/ODU conversion unit 211, a demultiplexing unit (DMUX) 212, and multiple AMP processing units 213. The OTU/ODU conversion unit 211 converts an HO-OTU2 signal input to the cross-connect device 2 into an HO-ODU2 signal and outputs the HO-ODU2 signal to the demultiplexing unit 212. The demultiplexing unit 212 separates or demultiplexes the HO-ODU2 signal from the OTU/ODU conversion unit 211 into multiple LO-ODU1 signals or LO-ODU2 signals (hereafter called LO-ODUk signals), and outputs the LO-ODUk signals to the corresponding AMP processing units 213. Each of the AMP processing units 213 demaps the LO-ODUk signal output from the demultiplexing unit 212 according to the AMP and outputs the demapped LO-ODUk signal to the LO-ODU switch 22 (see FIG. 8).

Figure 12:
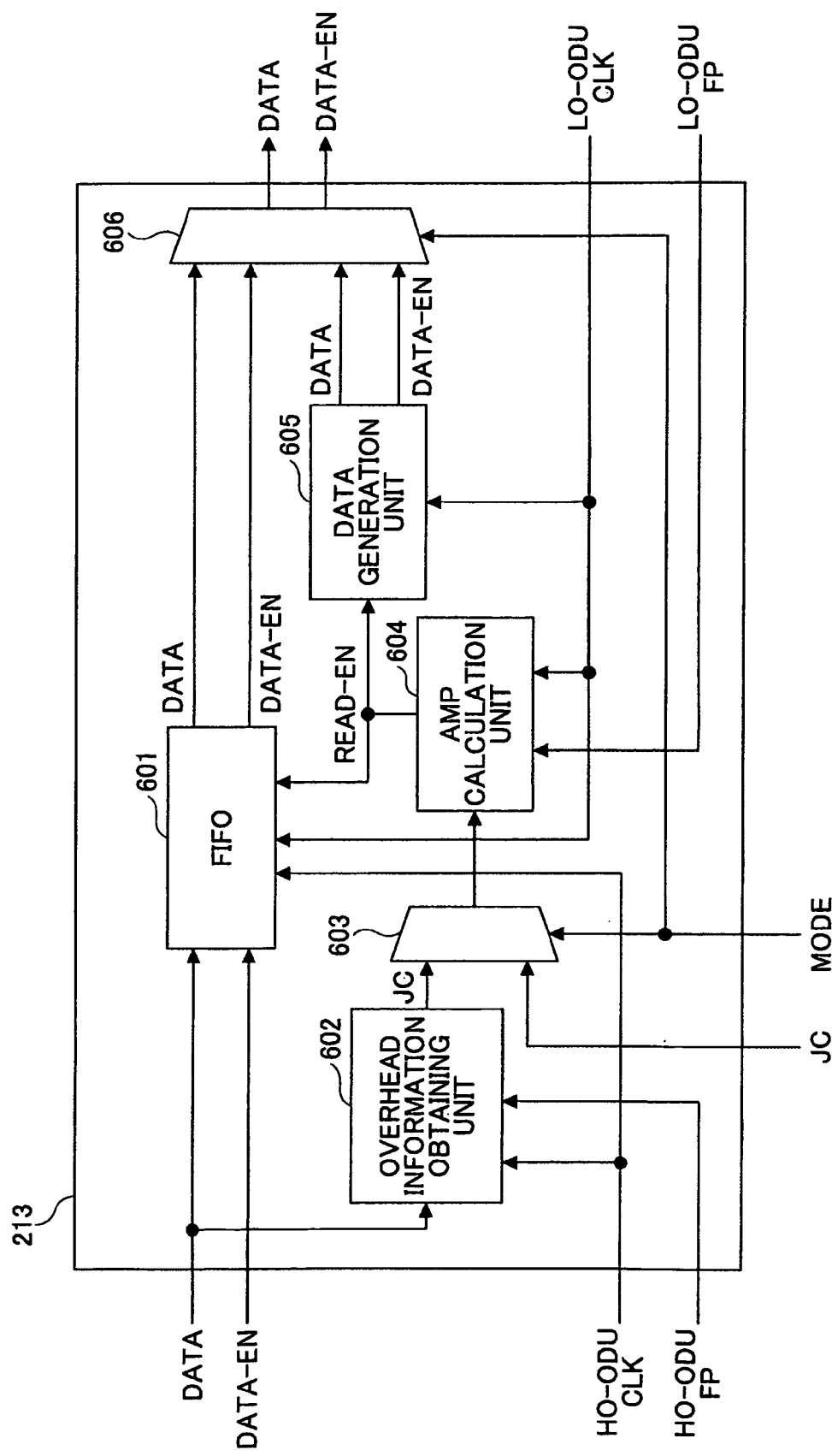
FIG. 12 is a block diagram illustrating an exemplary configuration of an AMP processing unit illustrated in FIG. 11.

FIG. 12 is a block diagram illustrating an exemplary configuration of the GMP processing unit 213 of the receiving-side HO-OTU terminal 21 of FIG. 11.

As illustrated in FIG. 12, the AMP processing unit 213 includes a FIFO 601, an overhead information obtaining unit 602, a JC selection unit 603, an AMP calculation unit 604, a data generation unit 605, and a data selection unit 606. The overhead information obtaining unit 602 functions as a parameter obtain circuit. The FIFO 601, the JC selection unit 603, the AMP calculation unit 604, the data generation unit 605, and the data selection unit 606 function as a frame process circuit.

The FIFO 601 stores a data signal DATA that is input as the HO-ODUk signal to the AMP processing unit 213 according to the timing of a clock signal HO-ODU_CLK with a frequency corresponding to the bit rate of the HO-ODUk signal when a data enable signal DATA-EN is enabled (or is ON). The data enable signal DATA-EN is input to the AMP processing unit 213 together with the data signal DATA. Also, the FIFO 601 outputs the data signal DATA according to the timing of a clock signal LO-ODU_CLK with a frequency corresponding to the bit rate of the LO-ODUk signal when a read enable signal READ-EN output from the AMP calculation unit 604 is enabled (or is ON).

The overhead information obtaining unit 602 receives the data signal DATA from a branch point of a signal path leading to the FIFO 601. When triggered by the clock signal HO-ODU_CLK corresponding to the HO-ODUk signal, the overhead information obtaining unit 602 obtains a value JC indicating the seventh and eighth bits of a JC byte in the OPU overhead of the data signal DATA (HO-ODUk frame) based on a frame pulse signal HO-ODU_FP indicating the head (or the leading edge) of the HO-ODUk signal, and outputs the value JC to the JC selection unit 603.

The JC selection unit 603 determines operation modes based on operation mode information MODE input from the management unit 24. When the operation mode is a normal mode where no communication error is detected, the JC selection unit 603 selects the value JC obtained by the overhead information obtaining unit 602 and outputs the selected value JC to the AMP calculation unit 604. Meanwhile, when the operation mode is a maintenance mode where a communication error is detected, the JC selection unit 603 selects a value JC input from the management unit 24 and outputs the selected value JC to the AMP calculation unit 604. The value JC input from the management unit 24 to the JC selection unit 603 may be calculated in a manner similar to the value JC input from the management unit 24 to the JC selection unit 503 described above.

The AMP calculation unit 604 includes a circuit that counts a current position j based on a frame pulse signal LO-ODU_FP indicating the head of the LO-ODUk signal by using the clock signal LO-ODU_CLK that corresponds to the LO-ODUk signal as a trigger. The current position j indicates a position from the head of the LO-ODUk signal in bytes. The AMP calculation unit 604 controls the read enable signal READ-EN in synchronization with the counting of the circuit. The AMP calculation unit 604 controls the read enable signal READ-EN in a manner similar to that of the AMP calculation unit 504 of the AMP processing unit 231 of the transmitting-side HO-OTU terminal 23. The AMP calculation unit 604 outputs the read enable signal READ-EN to the FIFO 601 when the operation mode information MODE indicates the normal mode or to the data generation unit 605 when the operation mode information MODE indicates the maintenance mode.

In the normal mode, when the read enable signal READ-EN from the AMP calculation unit 604 is enabled, the FIFO 601 outputs the first one byte of stored data to the data selection unit 606 using the clock signal LO-ODU_CLK that corresponds to the LO-ODUk signal as a trigger. Meanwhile, when the read enable signal READ-EN from the AMP calculation unit 604 is disabled, the FIFO 601 stops the output of data. As a result, a data signal DATA where data and stuff bytes are demapped according to the AMP is sent to the data selection unit 606. Together with the data signal DATA, the FIFO 606 outputs the read enable signal READ-EN received from the AMP calculation unit 604 as a data enable signal DATA-EN to the data selection unit 606.

In the maintenance mode, according to the read enable signal READ-EN output from the AMP calculation unit 604, the data generation unit 605 generates a maintenance signal that is in synchronization with the clock signal LO-ODUCLK corresponding to the LO-ODUk signal and outputs the maintenance signal to the data selection unit 606. Together with the maintenance signal, the data generation unit 605 outputs the read enable signal READ-EN received from the AMP calculation unit 604 as a data enable signal DATA-EN to the data selection unit 606. The configuration of the data generation unit 605 is substantially the same as that of the data generation unit 305 illustrated in FIG. 5.

When the operation mode information MODE indicates the normal mode, the data selection unit 606 selects the data signal DATA and the data enable signal DATA-EN sent from the FIFO 601 and outputs the selected signals to the LO-ODU switch 22 (see FIG. 8). Meanwhile, when the operation mode information MODE indicates the maintenance mode, the data selection unit 606 selects the AIS frame signal sent from the data generation unit 605 and outputs the AIS frame signal to the LO-ODU switch 22.

When the input of an HO-OTU2 signal to the cross-connect device 2 is interrupted due to a communication error, the receiving-side HO-OTU terminal 21 described above can automatically generate a maintenance signal (AIS frame signal) with substantially the same bit rate as that of the HO-OTU2 signal according to the value JC input from the management unit 24 to the AMP processing unit 213, and place the generated maintenance signal in the LO-ODUk signal. Similarly to the case where the maintenance signal is generated by the transmitting-side HO-OTU terminal 23, the receiving-side HO-OTU terminal 21 as illustrated in FIG. 11 makes it possible to generate the HO-OTU3 signal with a low-cost device having a simple configuration. The AMP calculation units 504 and 604 and the data generation units 505 and 605 may be composed of a circuit, a Field-Programmable Gate Array (FPGA), or a processor.

In the first and second embodiments described above, the management unit 14 or 24 determines the type of the LO-ODU signal based on information from the NMS 5 and sets the value Cm(t) or the value JC used to generate the maintenance signal. Alternatively, the type of the LO-ODU signal contained in an HO-OTU signal input to the receiving-side HO-OTU terminal 11 or 21 may be determined based on a payload type (PT) and a multiplex structure identifier (MSI) in the overhead of the HO-OTU signal to set the value Cm(t) or the value JC. Also, the value Cm(t) or the value JC may be set based on the measurement of the bit rate of the LO-ODU signal input to the transmitting-side HO-OTU terminal 13 or 23.

As described above, even when the input of a first frame signal is interrupted due to a communication error, a frame signal generating method and a frame signal generating device of the above embodiments can determine data and stuff byte positions using a second parameter that is set based on information regarding the type of the first frame signal. This in turn make it possible to generate a maintenance signal without using an oscillator corresponding to the bit rate of the first frame signal and to map or demap the maintenance signal. In other words, the above embodiments make it possible to generate a second frame signal using a low-cost device with a simple configuration even when there are various types of first frame signals.

Figure 13:
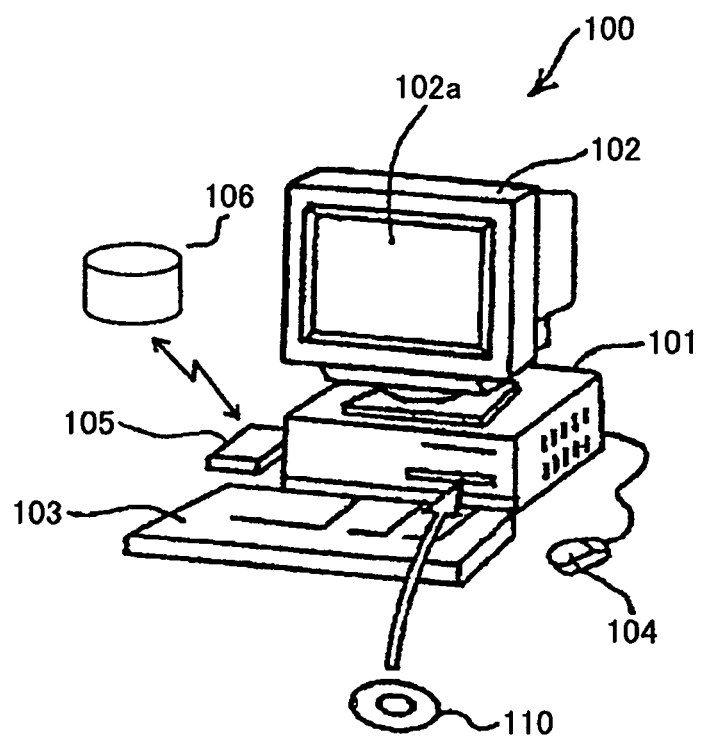
FIG. 13 is a drawing illustrating an exemplary configuration of a computer.

A frame signal generating method and a frame signal generating device according to the above embodiments may be implemented by a computer and a program stored in a computer-readable non-transitory medium that causes the computer to execute the frame signal generating method or to function as the frame signal generating device. FIG. 13 illustrates an exemplary configuration of a computer 100 usable for this purpose. As illustrated in FIG. 13, the computer 100 includes a main unit 101 including a CPU, memory, and a disk drive, a display 102 for displaying an image on a display screen 102a according to a request from the main unit 101, a keyboard 103 for inputting information into the computer 100, a mouse 104 for pointing a position on the display screen 102a, and a modem 105 used to access another computer to download programs or information stored in a storage medium 106 of the other computer. Also in FIG. 13, 110 indicates a storage medium that is readable by the computer 100. The storage medium 106 and/or the storage medium 110 stores a program that causes the computer 100 to execute a frame signal generating method or to function as a frame signal generating device as described in the above embodiments. Examples of the storage medium 106 and the storage medium 110 include an IC card memory, a flexible disk, a magneto optical disk, a CD-ROM, and a digital versatile disc (DVD).

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A method for generating a frame signal performed by a network device, the method comprising:
monitoring a first frame signal input to the network device and obtaining a first parameter based on the monitoring result;
setting a second parameter based on a type of the first frame signal;
when the first frame signal is being input to the network device, generating a second frame signal with a bit rate that is different from a bit rate of the first frame signal by determining data and stuff byte positions for frame processing based on the first parameter and by performing the frame processing on data and stuff bytes corresponding to the first frame signal based on the determined data and stuff byte positions; and
when the first frame signal is not being input to the network device, generating the second frame signal without using any oscillator by determining the data and stuff byte positions for the frame processing based on the second parameter and by performing the frame processing on data and stuff bytes corresponding to a maintenance signal based on the determined data and stuff byte positions.

2. The method as claimed in claim 1, wherein
the frame processing is a mapping process according to a generic mapping procedure;
the first parameter is obtained based on a count of a number of data entities of the first frame signal in one multiframe period of the second frame signal; and
the second parameter is calculated based on the type of the first frame signal.

3. The method as claimed in claim 1, wherein
the frame processing is a demapping process according to a generic mapping procedure;
the first parameter is obtained based on overhead information of the first frame signal; and
the second parameter is calculated based on the type of the first frame signal.

4. The method as claimed in claim 1, wherein
the frame processing is a mapping process according to an asynchronous mapping procedure;
the first parameter is a value JC indicating seventh and eighth bits of a justification control (JC) byte in the asynchronous mapping procedure and is obtained based on a count of a number of data entities of the first frame signal in one multiframe period of the second frame signal; and
the second parameter is a value JC indicating the seventh and eighth bits of the justification control (JC) byte in the asynchronous mapping procedure and is calculated based on the type of the first frame signal.

5. The method as claimed in claim 1, wherein
the frame processing is a demapping process according to an asynchronous mapping procedure;
the first parameter is a value JC indicating seventh and eighth bits of a justification control (JC) byte in the asynchronous mapping procedure and is obtained based on overhead information of the first frame signal; and
the second parameter is a value JC indicating the seventh and eighth bits of the justification control (JC) byte in the asynchronous mapping procedure and is calculated based on the type of the first frame signal.

6. A device for generating a frame signal, the device comprising:
a parameter obtain circuit configured to obtain a first parameter based on a first frame signal input to the device; and
a frame process circuit, wherein
when the first frame signal is being input to the device, the frame process circuit is configured to generate a second frame signal with a bit rate that is different from a bit rate of the first frame signal by determining data and stuff byte positions for frame processing based on the first parameter and by performing the frame processing on data and stuff bytes corresponding to the first frame signal based on the determined data and stuff byte positions; and
when the first frame signal is not being input to the device, the frame process circuit is configured to generate the second frame signal without using any oscillator by determining the data and stuff byte positions for the frame processing based on a type of the first frame signal and by performing the frame processing on data and stuff bytes corresponding to a maintenance signal based on the determined data and stuff byte positions.

7. The device as claimed in claim 6, further comprising:
a parameter set circuit configured to calculate a second parameter based on the type of the first frame signal, wherein
the frame process circuit is configured to perform a mapping process according to a generic mapping procedure; and the parameter obtain circuit is configured to obtain as the first parameter based on a count of a number of data entities of the first frame signal in one multiframe period of the second frame signal.

8. The device as claimed in claim 6, wherein
the frame process circuit is configured to perform a demapping process according to a generic mapping procedure;
the parameter obtain circuit is configured to obtain the first parameter based on overhead information of the first frame signal; and
the parameter set circuit is configured to calculate the second parameter based on the type of the first frame signal.

9. The device as claimed in claim 6, wherein
the frame process circuit is configured to perform a mapping process according to an asynchronous mapping procedure;
the parameter obtain circuit is configured to obtain a value JC indicating seventh and eighth bits of a justification control (JC) byte in the asynchronous mapping procedure as the first parameter based on a count of a number of data entities of the first frame signal in one multiframe period of the second frame signal; and
the parameter set circuit is configured to calculate a value JC indicating the seventh and eighth bits of the justification control (JC) byte in the asynchronous mapping procedure as the second parameter based on the type of the first frame signal.

10. The device as claimed in claim 6, wherein
the frame process circuit is configured to perform a demapping process according to an asynchronous mapping procedure;
the parameter obtain circuit is configured to obtain a value JC indicating seventh and eighth bits of a justification control (JC) byte in the asynchronous mapping procedure as the first parameter based on overhead information of the first frame signal; and
the parameter set circuit is configured to calculate a value JC indicating the seventh and eighth bits of the justification control (JC) byte in the asynchronous mapping procedure as the second parameter based on the type of the first frame signal.

11. The device as claimed in claim 6, wherein the frame process circuit includes
a data storage configured to store the first frame signal;
a parameter selector configured
to receive the first parameter and the second parameter,
to output the first parameter in a normal mode where the first frame signal is being input to the device, and
to output the second parameter in a maintenance mode where the first frame signal is not being input to the device;
a calculation circuit configured
to determine the data and stuff byte positions in the second frame signal based on one of the first parameter and the second parameter output from the parameter selector,
to generate a read enable signal for controlling timing of outputting data from the data storage, and
to output the read enable signal to the data storage in the normal mode;
a data generation circuit configured to generate the maintenance signal according to the read enable signal output from the calculation circuit in the maintenance mode; and
a data selector configured
to receive a data signal output from the data storage and a data signal output from the data generation circuit,
to output the data signal received from the data storage in the normal mode, and
to output the data signal received from the data generation circuit in the maintenance mode.

12. The device as claimed in claim 6, wherein the parameter set circuit is configured to determine the type of the first frame signal based on information sent from a network management system.

13. The device as claimed in claim 6, wherein the parameter set circuit is configured to determine the type of the first frame signal based on a payload type and a multiplex structure identifier in an overhead of a third frame signal containing the first frame signal.

* * * * *